Oct. 27, 1925.

J. MROZ 1,558,996

PHOTOGRAPHIC APPARATUS

Filed June 6, 1923

Josef Mroz
by his attorney
James Hamilton

Oct. 27, 1925.

J. MROZ 1,558,996

PHOTOGRAPHIC APPARATUS

Filed June 6, 1923

Josef Mroz
By his attorney
James H Hamilton

Patented Oct. 27, 1925.

1,558,996

UNITED STATES PATENT OFFICE.

JOSEF MROZ, OF VIENNA, AUSTRIA.

PHOTOGRAPHIC APPARATUS.

Application filed June 6, 1923. Serial No. 643,763.

*To all whom it may concern:*

Be it known that I, JOSEF MROZ, technical manager, a citizen of the Polish Republic, residing at Vienna, Austria, have invented certain new and useful Improvements in Photographic Apparatus, of which the following is a specification.

My invention relates to photographic apparatus using film-ribbons which have to be exposed in successive sections; and the subject matter of my invention is a device permitting use to be made of film-ribbons, especially of those generally employed for cinematographic purposes, but without the film-ribbons having to receive marks which when observed through an opening of the apparatus, allow of an exact advancement of the film for the length of a picture.

My invention relates further to photographic apparatus of a known kind having a carrier for three colored filters required for the taking of three-part negatives, by means of which arrangement the apparatus is made suitable for color-photography, the three-part negatives being step-by-step taken on the film-ribbon, and the advancement of the film-ribbon producing also the change of the color-filters. A feature of my invention is that, according to the color-filter brought into the axis of the objective, the diaphragm of the latter is thereby automatically more or less narrowed, in order to render it possible that the time of exposure through all the filters can be measured equally long.

A further object of my invention consists in arranging the filter carrier in such a manner that the position of the filters coinciding with the objective remains always a constant one with relation to the objective; so that, if the objective is adjustable in an axial direction, the filter carrier participates in the displacements of the objective. However, the filter carrier possesses no movablity other than the movability for producing the coincidence of the several filters with the objective, if the objective is fixed in the apparatus. In the latter case, according to my invention, that part of the film-ribbon ready to be exposed will then be made adjustable in the direction of the optical axis of the objective, in order to be able to exactly regulate the sharpness of the picture.

Figures 1 to 6 show one mode of execution of such an apparatus and Figures 7 and 8 a second mode of execution.

In Figures 1 to 6, 1 is a bottom plate of sheet metal preferably bent up under an angle of 90° and forming the front wall 2; at a certain distance above the bottom plate 1 there is fixed an intermediate bottom 3, which nearly completely covers the bottom plate 1 and which extends towards the front to a partition 4, arranged parallel to the front wall 2. Between the bottom plate 1 and the intermediate bottom 3 on the one hand and the front wall 2 and the partition 4 on the other hand is a chamber for the reception of a mechanism which will hereinafter be described.

The space above the intermediate bottom 3 is subdivided by two partitions 5 and 6 which diverge rearwards and the fore parts of which are bent outwardly into a cylindrical shape.

Figure 1:
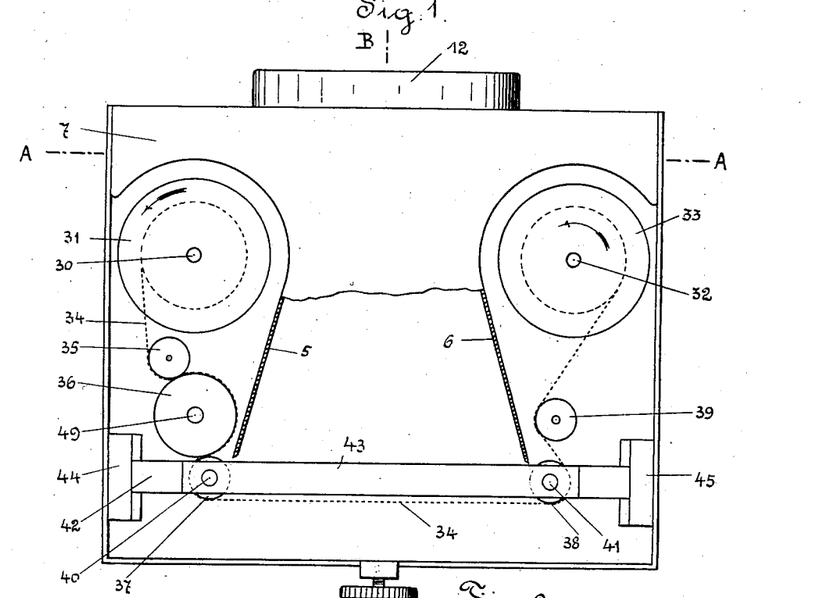
Fig. 1 is a plan view of the apparatus.
Figure 2:
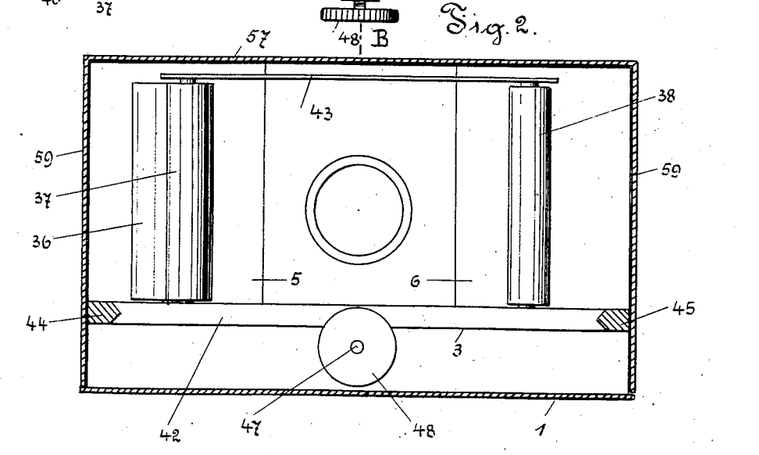
Fig. 2 illustrates the opened apparatus seen from behind towards the objective.
Figure 3:
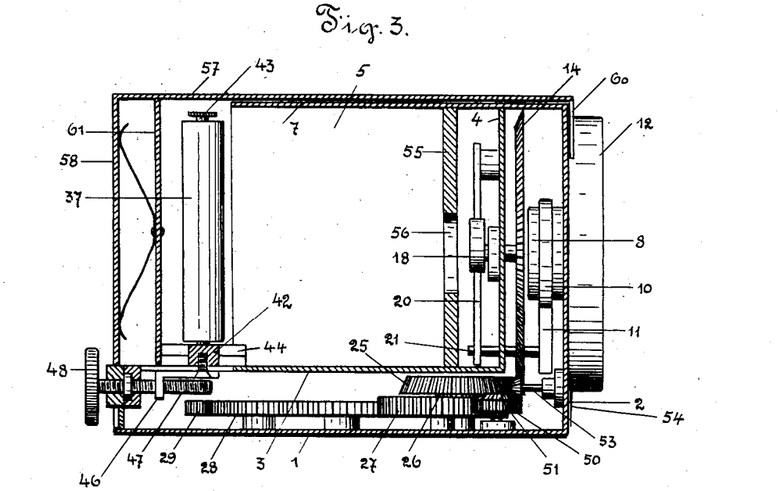
Fig. 3 is a sectional view according to line B—B of Fig. 1 from the right.

The space between the two partitions 5 and 6 is covered by a lidplate 7 (in Fig. 1 shown as broken) which plate also closes the front part of the apparatus on the upper side.

Figure 4:
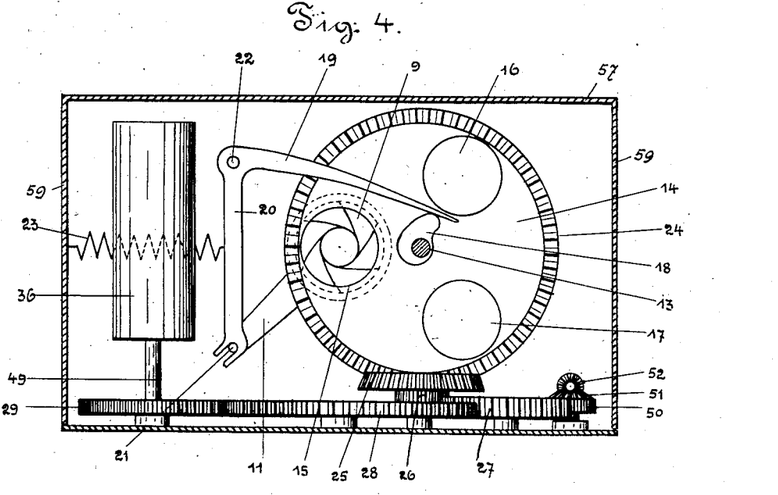
Fig. 4 is a sectional view according to the line A—A of Fig. 1.
Figure 5:
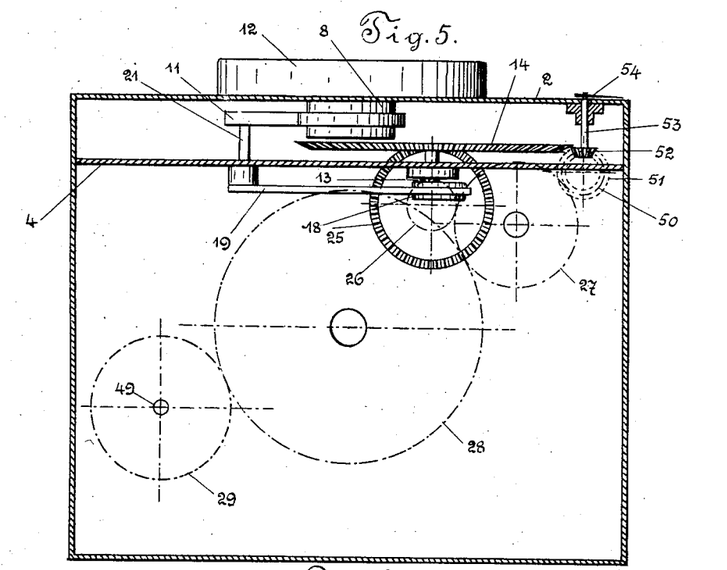
Fig. 5 is a plan view of the apparatus, the intermediate bottom being removed.
Figure 6:
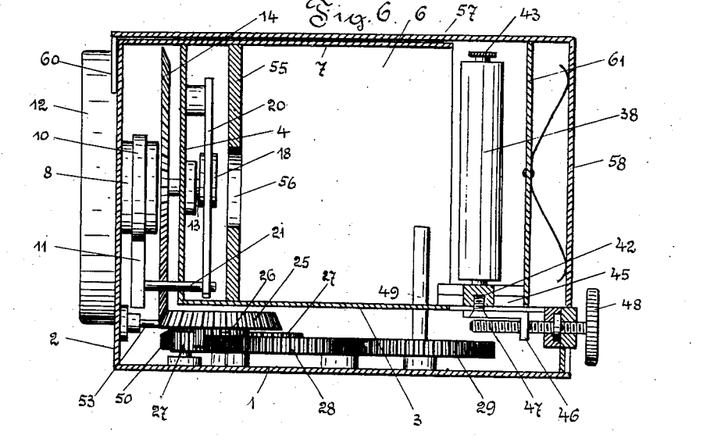
Fig. 6 is a section according to line B—B of Fig. 1 from the left.

At the front wall 2 is fixed the objective 8 containing in a known manner an iris-diaphragm 9 (Fig. 4) the size of which may be adjusted by turning the ring 10 (Figures 4 and 5). The adjustment of the diaphragm is effected by moving an arm 11 fixed to the ring 10. To the front end of the objective, there is fixed, in the usual manner, a casing 12, which contains the shutter for the objective.

In the partition 4 and laterally of the axis of the objective, there are bearings for the shaft 13 of a disk 14 that is formed with three apertures 15, 16, 17 in which are fixed the three color filters, e. g. a red, a blue, and a yellow or a green. By rotating the disk 14, the three filters may be brought successively in the axis of the objective.

A cam 18 is rigidly fixed on the shaft 13 of the disk 14 in such a manner that it rotates with the filter disk 14. In contact with the surface of this cam 18 is the arm 19 of a bell crank lever, the other arm 20 of which is fork-shaped and surrounds a pin 21 of the arm 11 of the diaphragm ring 10. The shaft 22 of the bell crank lever is mounted in bearings in the partition 4. The arm 20 is influenced by a spring 23 in such a way that the arm 19 is pressed against the cam 18. Upon rotating the cam 18, the bell crank lever 19, 20 is oscillated in proportion to the radius appertaining to the point of contact of the arm 19 with the cam 18; and these oscillations are imparted to the arm 11 of the diaphragm ring 10, thereby changing the size of the diaphragm. The proportions are so chosen that, when the blue colored filter is in coincidence with the objective, the diaphragm is of small size; when the yellow filter comes into coincidence with the objective, the size becomes larger; and, when the red filter comes in coincidence with the objective, the size of the diaphragm becomes still larger. By this automatic adjustment of the size of the diaphragm effected by rotating the filter disk 14, it is possible to use equal times of exposure for the three-part negatives.

The filter disk 14 has on its periphery a bevel gear 24 into which meshes a bevelled wheel 25 which is rigidly connected to a toothed wheel 26. This toothed wheel 26 is in mesh with a toothed wheel 27, this again with a toothed wheel 28 and this latter with a toothed wheel 29.

The toothed wheels 25, 26, 27, 28 and 29 are mounted in bearings in the chamber between the bottom plate 1 and the intermediate bottom 3. Upon actuating the toothed wheel 29, the filter disk 24 is rotated by means of these toothed wheels. Since the filter disk has to be rotated one third of a complete rotation when the film ribbon is shifted forwards for the length of a picture, the driving rotation of the toothed wheel 29 must be made dependent upon the advancing movement of the film-ribbon. This is effected in the following manner:

Upon the intermediate bottom 3 within the cylindrical recess formed by the partition 5, a vertical pin 30 is fixed, on which the spool 31, bearing the film ribbon is loosely mounted. In the cylindrical recess of the partition 6 is the bearing of a vertical shaft 32, extending through intermediate bottom 3 and also through the bottomplate 1, this shaft being provided at its end with a handle by means of which it may be rotated. The handle being a well known device, it is not represented in the drawing. In the chamber between the bottom plate 1 and the intermediate bottom 3, a ratchet wheel in gear with a pawl is fixed on the shaft 32, the object of this mechanism, not shown in the drawing, being to allow the rotation of the shaft 32 by means of the handle only in the direction of the arrow in Figure 1. A second spool 33 is mounted on and rigidly connected with the shaft 32 and serves to wind up the film ribbon 34 (represented, in dotted lines, as being wound on the spool 31, in Fig. 1). This ribbon runs thence over a guide-roll 35, a friction-roll 36 (preferably provided with an india-rubber coating), and the guide-rolls 37, 38, 39, to the spool 33. The friction-roll 36 is, for a considerable part of its periphery or cylindrical surface, covered by the film-ribbon. In this way, that portion of the film ribbon 34 stretched between the guiding rolls 37 and 38 is in a plane perpendicular to the optical axis of the objective. The two guiding rolls 37 and 38 are mounted on shafts 40 and 41, respectively, which are fixed on a traverse 42; on their upper side, they are supported by a rod 43. Each end of this traverse 42 is provided with a wedge-shaped groove, as may be seen in Fig. 2, into which on each side enters the similarly wedge-shaped surface of a guiding list 44, 45; these lists are fixed on the intermediate bottom 3. The traverse 43 is guided by the lists 44 and 45 and may be pushed forwards and backwards in the direction of the axis of the objective, whereby the guiding rolls 37 and 38 and also that portion of the film ribbon stretched between these guiding rolls are carried with it. By these means, the distance between the objective and that portion of the film ribbon opposite to the objective may be altered and consequently an accurate adjustment in accordance with the distance of the object to be photographed is obtained, even though in this mode of execution the objective is fixed in the apparatus.

To the underside of the traverse 42, there is secured an angle piece 46 extending through a slot into the chamber between the bottom plate 1 and the intermediate bottom 3. The vertical part of this angle piece 46 contains a threaded bore into which enters a screw 47 rotatably mounted in the rear wall of the chamber between the bottom plate 1 and the intermediate bottom 3, but not movable in the direction of its axis. On the outside of the apparatus, the screw 47 has a button 48 by means of which the screw may be rotated in either direction, whereby the traverse 42 is pulled backwards or forwards.

The guiding roll 39 (Fig. 1) may be yieldingly mounted and be pressed against the film ribbon by means of a spring (not illustrated in the drawings) in order to keep the film ribbon always stretched.

By rotating the spool 33 in the direction of the arrow, the film ribbon is drawn from the spool 31 and wound up on the spool 33. After one picture has been taken, the film ribbon must be shifted for the length of one picture. As the diameter of the winding on the spool 33 is always increasing, the amount of rotation of the spool 33 is not at all a measure for the shifting of the film, so that results would be incorrect, were the rotation of the filter disk 14 derived from the rotation of shaft 32 of spool 33.

Incorrect results would likewise be attained, were an indicator that is used for indicating the amount of shifting of the film directly or indirectly driven by the shaft 32 of spool 33. In order to arrive at correct results in both respects, the rotation of the filter disk 14, as well as the driving of the indicator, is derived from the shaft of the friction roll 36, which, being in frictional contact with the film ribbon, must be rotated always exactly in proportion to the shifting of the film.

For this reason the toothed wheel 29 is rigidly connected to the shaft 49 of the friction roll 36; and, if spool 33 is rotated so far that the film ribbon is shifted for the length of one picture, the filter disk 14 is rotated, by means of the toothed wheels 28, 29, 27, 26 and 25, for one third of a complete rotation, provided the ratio of transfer is correctly chosen so that the next filter is brought in the axis of the objective.

The toothed wheel 27 drives also a toothed wheel 50 that is rigidly connected with a bevel wheel 51, which meshes with a bevel wheel 52, on the shaft 53 of which a pointer 54 is provided outside the front wall 2 of the apparatus. Below this pointer 54 a scale is arranged on the front wall 2 and this scale indicates the amount of shifting of the film so that, by observing the pointer 54, it is possible to know exactly how long the spool 33 must be rotated in order to shift the film for the length of one picture. Any one of the toothed wheels 29, 28 or 27 may be made to drive a counting device indicating the number of film shiftings or, as the case may be, of exposures; this mechanism is not shown in the drawings.

As may be seen from the foregoing, ordinary film ribbons, such as are used for cinematographic purposes, may be employed without any adjustment and without being provided with any marks designed to be observed through an opening of the apparatus for the purpose of ensuring a correct shifting of the film.

The device as hereinbefore described, which permits the correct shifting of the film by observing the pointer 54, may evidently be used if the apparatus has no filter disk, i. e., if the apparatus is employed for only ordinary exposures.

Behind the partition 4, a further partition 55 may be arranged, which contains an aperture 56 in the direction of the axis of the objective. The light-tight closure of the apparatus is effected by a cover being applied to the upper edge of the front wall 2 and to the rear edge of bottom plate 1, this cover comprising a cover plate 57, a back wall 58 and two side walls 59. The back wall 58 of this cover is recessed at the point where the adjusting screw 47 projects outwardly.

The front edge of the cover plate 57 carries straps 60 by means of which the cover may be fastened to the front wall 2. This cover carries further a vertical partition 61 that is pressed by a spring against the film ribbon in order to maintain it smoothed out and flat. The cover may be speedily and easily removed whenever the spools have to be exchanged.

Figure 7:
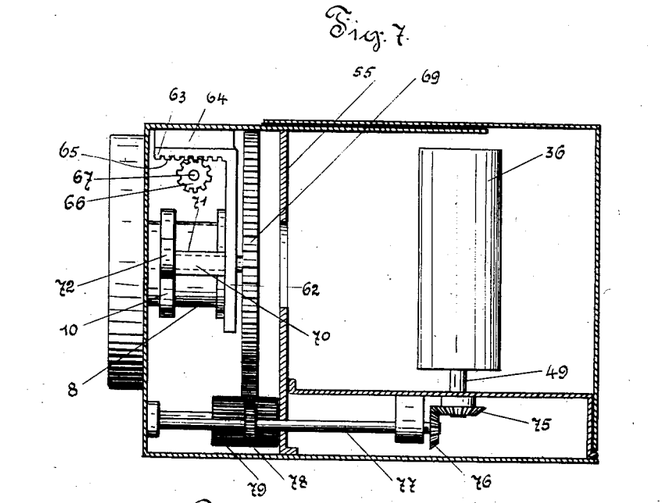
Figures 7 and 8 correspond to Figures 6 and 4 but refer, as mentioned above, to a second form of execution.
Figure 8:
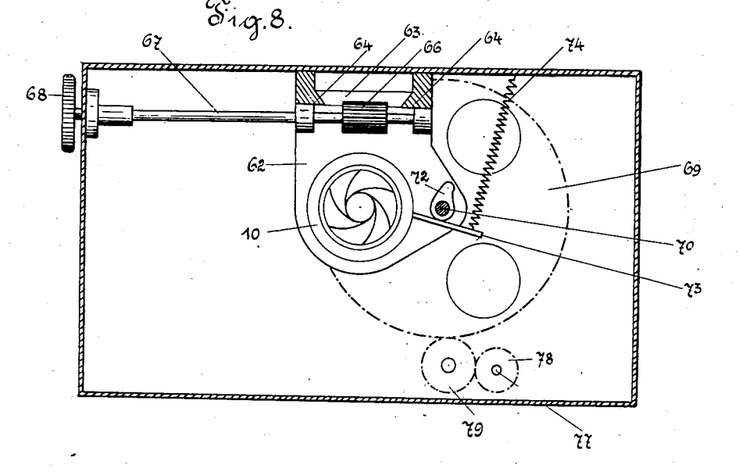

The other mode of execution of the apparatus (illustrated in Figures 7 and 8) may be, in its general construction, similar to that hereinbefore described. One difference consists in that here the objective may be adjusted in the direction of its axis, whilst that portion of the film opposite to the objective is not movable in the direction of the axis of the objective. The objective 8 is mounted in the vertical part of an angle-shaped support 62, the horizontal part 63 of which is dove-tailed and is horizontally guided between two dove-tailed lists 64. On the underside of this horizontal part 63 of support 62, there are arranged teeth 65 with which engages a toothed wheel 66 mounted on an axle 67 which extends to the outside and may be rotated by means of the button 68. According to the direction of rotation of the button 68, the support 62, 63 is moved forwards or backwards; and the objective participates in this movement.

The support 62, 63 carries also the filter disk 69, the axle 70 of which rests in a box 71 fastened to the support 62 and carries also the cam 72 disposed here in the plane of the ring 10 of the diaphragm of the objective 8. On this ring 10 there is mounted an arm 73 that is pressed against the cam 72 by means of a spring 74. Upon rotating the filter disk 69, the cam 72 rotates too, whereby the size of the diaphragm is altered, the change in the size of the diaphragm depending upon which one of the filters is moved into the axis of the objective, in a manner similar to that described in connection with the apparatus illustrated in Figs. 1 to 6, both inclusive.

The motion of rotation of the filter disk is here also derived from the friction roll 36 but in a way slightly different from that described in connection with the apparatus shown in Figs. 1 to 6, inclusive. The axle 49 of the friction roll 36 carries a bevel wheel 75, that meshes with a bevel wheel 76 keyed on the shaft 77. This shaft 77 carries a toothed wheel 78 in gear with a broad toothed wheel 79, which meshes with teeth surrounding the surface of the filter disk 69.

The filter disk 69 being capable of displacement in an axial direction together with the support 62 and with the objective 8, the toothed wheel 79 must be sufficiently wide in order to maintain engagement therewith of the teeth of the filter disk in all of its displacements.

The cam 18 (or as the case may be, the cam 72) may be made exchangeable in order to adapt the displacement of the diaphragm to the light permeability of the filters used.

From a constructional point of view, making the adjustment of the diaphragm dependent upon the movement of the carrier of the filters may be executed also in other ways than the ones herein shown and described, the main point being to bring means moving with the filter-carrier into relation with the mechanism of adjustment of the diaphragm. It is obvious that the mechanism for transmitting the movement of the friction roll 36 to the filter-carrier and to the indicators for showing the shifting of the film (or, as the case may be, for registering the number of the exposures) may be carried out in a different manner without departing from the principle of the invention. If it is desired to take only ordinary exposures, the filter may entirely be dispensed with; and, in this case, the mechanism driven by the friction roll actuates only the indicating devices.

The friction roll may be disposed at any desired part of the film ribbon on its way from one spool to the other; in every case, it will suit the purpose in view to have this friction roll surrounded by the film ribbon in a proportionally long arc in order to ensure a secure engagement by friction.

For the displacement of the guiding rolls 37 and 38 with apparatus having fixed objectives, any suitable mechanism other than that herein illustrated may, of course, be employed. Likewise the whole construction of the apparatus may be modified in its several novel features within the scope of the invention.

What I claim as my invention and desire to secure by Letters Patent is:

1. A photographic apparatus adapted for the use of film-ribbons running from one spool to a second, comprising an objective, guiding rolls for the film ribbon, two of which are arranged in such a manner as to hold a portion of the film ribbon in a plane perpendicular to the optical axis of the objective, a friction roll against which the film ribbon is pressed and which is driven by the film ribbon, a movable carrier having apertures, color-filters fixed within the said apertures and a mechanism for transmitting the rotations of the friction roll to the said filter-carrier in order to bring the color-filters successively in coincidence with the objective.

2. A photographic apparatus adapted for the use of film-ribbons running from one spool to a second, comprising an objective, guiding rolls for the film ribbon, two of which are arranged in such a manner as to hold a portion of the film ribbon in a plane perpendicular to the optical axis of the objective, a friction roll against which the film ribbon is pressed and which is driven by the moved film ribbon, a device for indicating on the outside of the apparatus the shifting of the film ribbon, a mechanism for transmitting the rotations of the friction roll to the said indicating device, a movable carrier having apertures, color-filters fixed within the said apertures and a mechanism for transmitting the rotations of the said friction roll to the said filter-carrier in order to bring the color-filters successively in coincidence with the objective.

3. A photographic apparatus adapted for the use of film-ribbons running from one spool to a second, comprising an objective, guiding rolls for the film ribbon, two of which are arranged in such a manner as to hold a portion of the film ribbon in a plane perpendicular to the optical axis of the objective, a friction roll against which the film ribbon is pressed and which is driven by the moved film ribbon, a disk rotatable around an axis parallel to the axis of the objective and having apertures, color-filters fixed within the said apertures and a mechanism for transmitting the rotations of the said friction roll to the said filter disk in order to bring the color-filters successively in coincidence with the objective.

4. A photographic apparatus adapted for the use of film ribbons, running from one spool to a second, comprising an objective, guiding rolls for the film ribbon, two of which are arranged in such a manner as to hold a portion of the film ribbon in a plane perpendicular to the optical axis of the objective, these two guiding rolls being mounted on a support movable in the direction of the optical axis of the objective backwards and forwards, means for moving the said support, a friction roll against which the film ribbon is pressed and which is driven by the moved film ribbon, a disk rotatable around an axis lying parallel to the axis of the objective and having apertures, color-filters fixed within the said apertures, a mechanism for transmitting the rotation of the friction roll to the said disk, in order to bring the color-filters successively in coincidence with the objective.

5. A photographic apparatus adapted for the use of film ribbons, running from one spool to a second, comprising an objective, an adjustable diaphragm, guiding rolls for the film ribbon, two of which are arranged in such a manner as to hold a portion of the film ribbon in a plane perpendicular to the optical axis of the objective, a movable carrier having apertures, color-filters fixed within the said apertures, a mechanism for moving the said carrier in order to bring successively the color-filters in coincidence with the objective and a mechanism for adjusting the size of the said diaphragm in such a manner that the size of the diaphragm is largest if the red filter is in coincidence with the objective, smallest if the green filter is in coincidence with the objective and medium if the blue filter is in coincidence with the objective.

6. In a photographic apparatus, the combination of an objective, an adjustable diaphragm, a movable carrier having apertures, color-filters fixed within the said apertures, a mechanism for moving the said carrier in order to bring successively the color-filters in coincidence with the objective and a mechanism for adjusting the size of the said diaphragm in such a manner that the size of the diaphragm is largest if the red filter is in coincidence with the objective, smallest if the green filter is in coincidence with the objective and medium if the blue filter is in coincidence with the objective.

7. In a photographic apparatus the combination of an objective, and adjustable diaphragm, a disk rotatable around an axis lying parallel to the axis of the objective, this disk having apertures, color-filters fixed within these apertures, a mechanism for rotating the disk in order to bring successively the color filters in coincidence with the objective, and a mechanism for adjusting the size of the said diaphragm in such a manner that the size of the diaphragm is largest if the red filter is in coincidence with the objective, smallest if the green filter is in coincidence with the objective and medium if the blue filter is in coincidence with the objective.

8. In a photographic apparatus the combination of an objective, an adjustable diaphragm, a disk rotatable around an axis lying parallel to the axis of the objective, this disk having apertures, color-filters fixed within these apertures, a mechanism for rotating the disk in order to bring successively the color-filters in coincidence with the objective, a cam that is in connection with the said filter disk and means actuated by the said cam and influencing the said diaphragm for adjusting it in such a manner that the size of the diaphragm is largest if the red filter is in coincidence with the objective, smallest if the green filter is in coincidence with the objective and medium if the blue filter is in coincidence with the objective.

9. A photographic apparatus adapted for the use of film ribbons, running from one spool to a second, comprising an objective, an adjustable diaphragm, guiding rolls for the film ribbon, two of which are arranged in such a manner as to hold a portion of the film ribbon in a plane perpendicular to the optical axis of the objective, a disk rotatable around an axis lying parallel to the axis of the objective, the said disk having apertures, color-filters fixed within the said apertures, a mechanism for rotating the said disk in order to bring successively the color-filters in coincidence with the objective and a mechanism for adjusting the diaphragm in such a manner that the size of the diaphragm is largest if the red filter is in coincidence with the objective, smallest if the green filter is in coincidence with the objective and medium if the blue filter is in coincidence with the objective.

10. A photographic apparatus adapted for the use of film ribbons, running from one spool to a second, comprising an objective, an adjustable diaphragm, guiding rolls for the film ribbon, two of which are arranged in such a manner as to hold a portion of the film ribbon in a plane perpendicular to the optical axis of the objective, these two guiding rolls being mounted on a support movable in the direction of the optical axis of the objective backwards and forwards means for moving the said support, a disk rotatable around an axis lying parallel to the axis of the objective, this disk having apertures, color-filters fixed within the said apertures, a mechanism for rotating the said disk to bring successively the color-filters in coincidence with the objective and a mechanism for adjusting the said diaphragm in such a manner that the size of the diaphragm is largest if the red filter is in coincidence with the objective, smallest if the green filter is in coincidence with the objective and medium if the blue filter is in coincidence with the objective.

11. A photographic apparatus adapted for the use of film ribbons, running from one spool to a second, comprising an objective, an adjustable diaphragm, guiding rolls for the film ribbon, two of which are arranged in such a manner as to hold a portion of the film ribbon in a plane perpendicular to the optical axis of the objective, a friction roll against which the film ribbon is pressed and which is driven by the film ribbon, a disk rotatable around an axis lying parallel to the axis of the objective, this disk having apertures, color-filters fixed within the said apertures, means for rotating the said disk in order to bring successively the color-filters in coincidence with the objective, a mechanism for transmitting the rotation of the said friction roll to the means for rotating the said filter disk and a mechanism for adjusting the size of the said diaphragm, in such a manner that the size of the diaphragm is largest if the red filter is in coincidence with the objective, smallest if the green filter is in conicidence with the objective and medium if the blue filter is in coincidence with the objective.

12. A protographic apparatus adapted for the use of film ribbons running from one spool to a second, comprising an objective, an adjustable diaphragm, guiding rolls for the film ribbon, two of which are arranged in such a manner as to hold a portion of the film ribbon in a plane perpendicular to the optical axis of the objective, a friction roll against which the film ribbon is pressed and which is driven by the film ribbon, a disk rotatable around an axis lying parallel to the axis of the objective, this disk having apertures, color-filters fixed within the said apertures, means for rotating the said disk in order to bring the color-filters successively in coincidence with the objective, a mechanism for transmitting the rotation of the said friction roll to the means for rotating the filter disk, a cam which is in connection with the said filter disk and an arm actuated by the said cam and influencing the diaphragm in such a manner that the size of the diaphragm is largest if the red filter is in coincidence with the objective, smallest if the green filter is in coincidence with the objective and medium if the blue filter is in coincidence with the objective.

13. A photographic apparatus adapted for the use of film ribbons running from one spool to a second, comprising an objective, an adjustable diaphragm, guiding rolls for the film ribbon, two of which are arranged in such a manner as to hold a portion of the film ribbon in a plane perpendicular to the optical axis of the objective, these two guiding rolls being mounted on a support movable in the direction of the optical axis of the objective backwards and forwards, a mechanism for moving the said support, a friction roll against which the film ribbon is pressed and which is driven by the film ribbon, a disk rotatable around an axis lying parallel to the axis of the objective, this disk having apertures, color-filters fixed within the said apertures, means for rotating the said disk to bring the color-filters successively in coincidence with the objective, a mechanism for transmitting the rotation of the said friction roll to the means for rotating the filter disk, a cam being in connection with the filter disk and means actuated by the cam and influencing the diaphragm for adjusting it, in such a manner that the size of the diaphragm is largest if the red filter is in coincidence with the objective, smallest if the green filter is in coincidence with the objective and medium if the blue filter is in coincidence with the objective.

14. A photographic apparatus adapted for the use of film ribbons, running from one spool to a second, comprising an objective, an adjustable diaphragm, guiding rolls for the film ribbon, two of which are arranged in such a manner as to hold a portion of the film ribbon in a plane perpendicular to the optical axis of the objective, a friction roll against which the film ribbon is pressed and which is driven by the film ribbon, a disk rotatable around an axis lying parallel to the axis of the objective, this disk having apertures, color-filters fixed within the said apertures, means for rotating the said disk in order to bring the color-filters successively in coincidence with the objective, a mechanism for transmitting the rotation of the said friction roll to the means for rotating the said filter disk, means connected with the said filter disk for adjusting the diaphragm in such a manner that the size of the diaphragm is largest if the red filter is in coincidence with the objective, smallest if the green filter is in coincidence with the objective and medium if the blue filter is in coincidence with the objective, a device for indicating on the outside of the apparatus the shifting of the film ribbon and a mechanism for transmitting the rotation of the friction roll to the said indicating device.

15. In a photographic apparatus the combination of an objective, an adjustable diaphragm, a movable carrier having apertures, color-filters fixed within the said apertures, a mechanism for moving the filter carrier to bring the color-filters successively in coincidence with the objective and means for adjusting the diaphragm in such a manner that the size of the diaphragm is largest if the red filter is in coincidence with the objective, smallest if the green filter is in coincidence with the objective and medium if the blue filter is in coincidence with the objective, the said means for adjusting the diaphragm being in connection with the said mechanism for moving the filter carrier.

16. In a photographic apparatus the combination of an objective, a movable carrier having apertures, color-filters fixed within the said apertures, a movable support carrying the objective and the filter-carrier, a mechanism for moving the said support in the direction of the optical axis of the objective backwards and forwards and a mechanism for moving the filter carrier to bring the color-filters successively in coincidence with the objective.

17. In a photographic apparatus the combination of an objective, a disk rotatable round an axis lying parallel to the axis of the objective, this disk having apertures, color-filters fixed within the apertures, a mechanism for rotating the filter disk in order to bring the color-filters successively in coincidence with the objective, a movable support carrying the objective and the filter-disk and a mechanism for moving the said support in the direction of the optical axis of the objective backwards and forwards.

18. In a photographic apparatus the combination of an objective, an adjustable diaphragm, a disk rotatable round an axis lying parallel to the axis of the objective, this disk having apertures, color-filters fixed within the said apertures, a mechanism for rotating the filter disk in order to bring the color-filters successively in coincidence with the objective, a movable support carrying the objective and the filter disk, a mechanism for moving the said support in the direction of the optical axis of the objective backwards and forwards, means for adjusting the said diaphragm, these means being in connection with the said filter disk, in order to adjust the diaphragm in such a manner that the size of the diaphragm is largest if the red filter is in coincidence with the objective, smallest if the green filter is in coincidence with the objective and medium if the blue filter is in coincidence with the objective.

19. In a photographic apparatus, the combination of an objective, an adjustable diaphragm, a movable carrier having apertures, color-filters fixed within the said apertures, a mechanism for moving the said carrier in order to bring the color-filters successively in coincidence with the objective, a mechanism for adjusting the diaphragm in such a manner that the size of the diaphragm is largest if the red filter is in coincidence with the objective, smallest if the green filter is in coincidence with the objective and medium if the blue filter is in coincidence with the objective, a movable support carrying the objective and the filter carrier and a mechanism for moving the said support in the direction of the optical axis of the objective backwards and forwards.

20. In a photographic apparatus the combination of an objective, an adjustable diaphragm, a disk rotatable around an axis lying parallel to the axis of the objective, this disk having apertures, color-filters fixed within the said apertures, a mechanism for rotating the filter disk in order to bring the color-filters successively in coincidence with the objective, a cam which is in connection with the filter disk and an arm acting upon the said adjustable diaphragm and being influenced by the said cam in order to adjust the diaphragm in such a manner that the size of the diaphragm is largest if the red filter is in coincidence with the objective, smallest if the green filter is in coincidence with the objective and medium if the blue filter is in coincidence with the objective.

21. A photographic apparatus adapted for the use of film ribbons running from one spool to a second, comprising an objective, an adjustable diaphragm, guiding rolls for the film ribbons, two of which are arranged in such a manner as to hold a portion of the film ribbon in a plane perpendicular to the optical axis of the objective, a friction roll against which the film ribbon is pressed and which is driven by the film ribbon, a disk rotatable around an axis lying parallel to the axis of the objective, this disk having apertures, color-filters fixed within the said apertures, means for rotating the said disk in order to bring the color-filters successively in coincidence with the objective, a mechanism for transmitting the rotation of the said friction roll to the means for rotating the filter disk, means connected with the filter disk for adjusting the diaphragm, in such a manner that the size of the diaphragm is largest if the red filter is in coincidence with the objective, smallest if the green filter is in coincidence with the objective and medium if the blue filter is in coincidence with the objective, a movable support carrying the objective, the filter disk and the means for adjusting the diaphragm and a mechanism for moving the said support in the direction of the optical axis of the objective backwards and forwards.

22. A photographic apparatus adapted for the use of film ribbons running from one spool to a second, comprising an objective, an adjustable diaphragm, guiding rolls for the film ribbon two of which being arranged in such a manner as to hold a portion of the film ribbon in a plane perpendicular to the optical axis of the objective, a friction roll against which the film ribbon is pressed and which is driven by the moved film ribbon, a disk rotatable around an axis lying parallel to the axis of the objective, this disk having apertures, color-filters fixed within the said apertures, means for rotating the said disk in order to bring the color-filters successively in coincidence with the objective, a mechanism for transmitting the rotation of the said friction roll to the means for rotating the filter disk, means connected with the said filter disk for adjusting the diaphragm in such a manner that the size of the diaphragm is largest if the red filter is in coincidence with the objective, smallest if the green filter is in coincidence with the objective and medium if the blue filter is in coincidence with the objective, a device for indicating on the outside of the apparatus the shifting of the film ribbon, a mechanism for transmitting the rotation of the said friction roll to this indicating device, a movable support carrying the objective, the filter disk and the means for adjusting the diaphragm, and a mechanism for moving the said support in the direction of the optical axis of the objective backwards and forwards.

In testimony whereof I affix my signature.

JOSEF MROZ.